Feb. 28, 1928.
H. J. LOUNSBURY
1,660,452
HAND BRAKE FOR RAILWAY CARS
Filed June 8, 1925
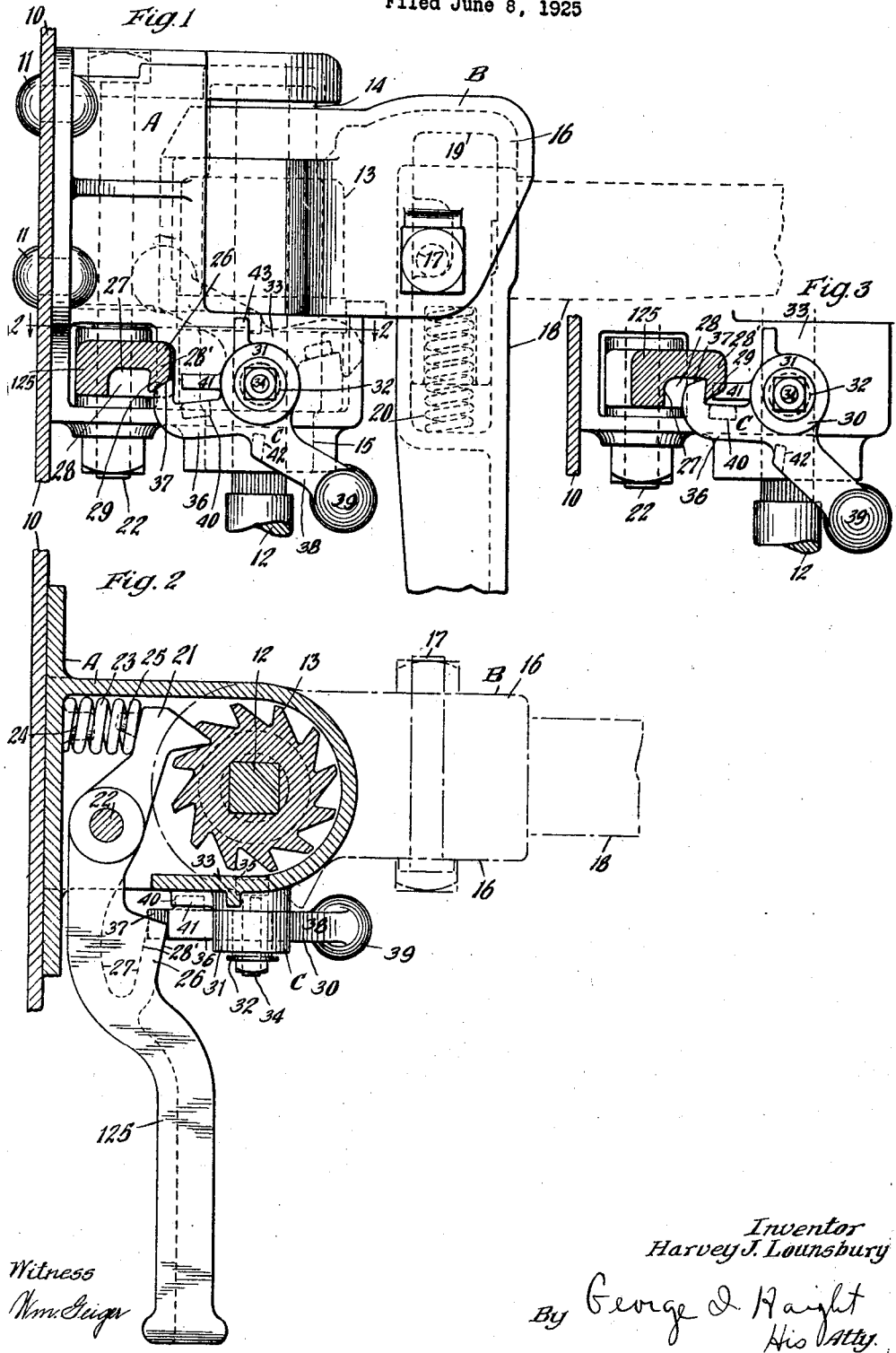
Witness
Wm. Giger
Inventor
Harvey J. Lounsbury
By George D. Haight
His Atty.

Patented Feb. 28, 1928.

1,660,452

UNITED STATES PATENT OFFICE.

HARVEY J. LOUNSBURY, OF CHICAGO, ILLINOIS, ASSIGNOR TO W. H. MINER, INC., OF CHICAGO, ILLINOIS, A CORPORATION OF DELAWARE.

HAND BRAKE FOR RAILWAY CARS.

Application filed June 8, 1925. Serial No. 35,675.

This invention relates to improvements in hand brakes for railway cars.

In the operation of hand brakes of the vertical staff type in which means are provided for rotating the staff to wind the brake chain thereon, ratchet mechanism is also provided for preventing accidental reverse rotation of the staff, and when it is desired to release the brakes, the release lever of the ratchet mechanism must be disconnected and manually held out of engagement until the brake chain has unwound sufficiently to release the brake shoes and immediately the lever is released the same resumes its normally engaged position with the ratchet associated with the staff, preventing any further reverse rotation of the staff. Due to carelessness on the part of brakemen, or to lack of time, the release ratchet is frequently permitted to resume its engaged position with the brake staff before the brake staff has unwound sufficiently to fully release the brake shoes, and in addition even though the brakeman holds the release lever in retracted position long enough to permit apparent full release of the brake staff, it has been found in practice that even under these circumstances the brake staff does not unwind to the full extent, and sometimes will unwind further under the jarring and vibration of the train, if left free to do so, and since it is obviously impracticable for the operator to hold the release lever to disengaged position for an indefinite time, the brakes with this type of apparatus are almost never fully released, resulting in dragging of the brake shoes upon the wheels, and consequent great wear upon the parts and increased tractive effort by the locomotive.

The purpose of the present invention is to provide means mounted on the brake structure adjacent to the release lever of the brake, and arranged to be normally urged in one direction, the release lever and the engaging means being provided with co-operating parts, whereby movement of the release lever in a direction to release the locking dog, will cause automatic engagement between the parts to maintain the dog out of operative engagement, so that the brake staff will be free to unwind to its full extent, said engaging means being of such a character that the same may be turned to inoperative position and assume an overbalanced condition, by which the same is retained out of the path of the release lever, thereby permitting ordinary operation of the brake mechanism when desired.

Other and further objects of the invention will more fully and clearly appear from the description and claims hereinafter following.

In the drawing forming part of this specification, Figure 1 is a vertical sectional view through the end wall of the car, showing a side elevation of the hand brake mechanism, with my improvements incorporated therein. Figure 2 is a horizontal sectional view of the invention on the line 2—2 of Figure 1; and Figure 3 is a fragmentary part sectional and part elevational view of the invention similar to Figure 1 showing the release lever retained in retracted position by the locking mechanism.

In said drawing the end wall of the car is indicated at 10, to which is secured a housing or bearing bracket designated generally by the reference character A. The housing A is secured to the wall 10 by means of suitable rivets 11, and projecting into the housing is the usual vertical brake staff, a portion of which is indicated at 12, the staff having a squared or other non-circular cross-section at the top thereof, on which is rigidly fitted a ratchet wheel indicated in dotted lines at 13, the ratchet wheel being suitably mounted in the housing by journals 14 and 15. Oscillatably mounted upon the journal member 14 is a carrier or fulcrum member designated generally by the reference character B. The carrier B is provided with laterally extending wings 16, and pivotally mounted between the wings 16, on the horizontal bolt 17 is an operating handle or lever 18. The handle 18 is provided at the top thereof with a socket in which is slidably mounted a pawl 19 normally impelled outwardly by means of the spring 20. The arrangement of the handle and pawl is such that when the handle is elevated to a horizontal position as shown in dotted lines in Figure 1, the pawl is operatively engaged with the ratchet wheel 13, and when the handle is released, it automatically falls to a depending vertical inoperative position, as shown in full lines in Figure 1. All of the above described construction is old and well known and no claim is made thereto, except in combination with novel means for preventing accidental reverse rotation of the staff which means will be now referred to.

To hold the staff 12 against accidental rotation a locking dog 21 is provided, pivotally mounted upon the bolt 22 disposed in the housing A, such dog being adapted to engage the lower end of the ratchet wheel 13, the dog 21 being normally urged to engaged position with the ratchet wheel 13 by means of a coiled spring 23 one end of which is disposed about the lug 24 formed on the inner wall of the housing, and the other end of which is disposed about a lug 25 formed on the end of the dog 21. Forming part of the dog 21 is a release lever or handle 125, such release lever being of a peculiar character adapting the same for co-operation with a locking device generally indicated by the reference character C, adapted in certain positions to maintain the lever in inoperative position. In ordinary operation of hand brakes of this character, the brake staff is rotated by means of the lever 18, to set the brakes, accidental reverse rotation of the staff being prevented by the dog 21. When it is desired to release the brake, the release lever 125 is manually pulled in an anti-clockwise direction, and such lever must be manually held until the brake is fully released.

In carrying out my invention the release lever 125 is provided with an offset portion 26, the undersurface of which is cut out as indicated at 27, providing a longitudinally extending groove 28 forming a rib 28', the under surface of which has a cam surface 29, such arrangement being provided for cooperation with the locking mechanism C.

The locking mechanism C includes a latch designated generally at 30. The latch 30 includes a journal section 31 pivotally supported upon a boss 32 formed upon the side wall 33 of the housing A, a bolt 34 extending through the boss 32 and having on the outer end thereof a nut, the head of the bolt being disposed in the cavity 35 in the wall 33 of the housing A. The latch 30 includes a hooked or shouldered portion 36, the hooked extremity being provided with a cam face 37 oppositely disposed with reference to the cam face 29 on the rib 28'. The latch 30 also includes an extension 38, preferably extending at an angle to the hooked portion 36, and on the outer end of the extension 38 is an enlargement 39 adapted to add sufficient weight to the extension so that the hooked portion is normally urged in a clockwise direction. The hooked portion 36 is provided with a stop member 40, adapted to engage a co-operating fixed stop 41 formed on the housing, to limit the upward movement of the hooked portion 36. The extension 38 is also provided with a stop 42 adapted to engage a vertically extending fixed stop 43 formed on the housing, when the latch 30 is moved to inoperative position as indicated in dotted lines in Figure 1.

In operation, when it is desired to wind the brake staff in a clockwise direction the lever 18 is raised from its normal depending position to the horizontal position as indicated in dotted lines in Figure 1, causing engagement of the pawl 19 with the ratchet wheel 13, oscillation of the lever causing rotation of the ratchet wheel. During this movement accidental retrograde rotation of the staff is prevented by the engagement of the dog 21, which is normally held against the ratchet wheel 13 by the spring 23. When it is desired to release the brakes, the handle 125 is manually pulled in a counter-clockwise direction, disengaging the dog 21 from the ratchet wheel 13, and during this action the cam face 29 upon the rib 28' forming part of the lever 125 will ride upon the cam face 37 of the hooked portion 36 of the latch member 30, causing the latch to be depressed, and further movement of the release lever causes the hooked portion to ride behind the rib 28' by reason of the force exerted thereon by the weighted extension 38, thereby locking the release lever 125, and consequently the dog 21, in fully released position, so that the brake staff is entirely free to unwind to its full extent. The latch 30 may be disengaged to permit reengagement of the dog 21 with the ratchet wheel by pulling the extension 38 in an upward direction, the dog returning into engagement under the influence of the spring 23. When it is desired to completely disengage the automatic locking latch, the same may be swung upwardly to an overbalanced position as illustrated in dotted lines in Figure 1, the stop 42 on the extension 38 engaging the stop 43 to limit the movement of the latch, and the same is thus held under the influence of gravity in an overbalanced inoperative position.

While I have herein shown and described what I now consider the preferred manner of carrying out my invention, the same is merely illustrated and I contemplate all changes and modifications that come within the scope of the claims appended hereto.

I claim:

1. In a hand brake, the combination with a member adapted to be rotated to effect tightening of the brake chain; of a ratchet wheel rotatable with said member; a pivoted dog co-operable with said ratchet wheel, said dog being normally urged to operative position and provided with an extension by which the same may be released, said extension having a longitudinally extending groove on its undersurface; and a pivoted locking member mounted adjacent to said extension and normally urged in one direction, said locking member being provided with a shouldered portion adapted to automatically engage within the groove in said extension when said extension is moved to releasing position.

2. In a hand brake, the combination with a member adapted to be rotated to effect tightening of the brake chain; of a ratchet element rotatable with said member; a locking dog co-operating with said element, means for yieldingly urging said dog into engagement with said element; an operating handle on said dog for moving the same out of engagement with said element; and a swinging latch member automatically engageable with said dog when the latter is moved out of engagement with said element for holding the same disengaged therefrom, said latch element having a weighted portion normally urging the latch toward said dog to engage the same, said latch element being movable to displace the weighted portion thereof in a position to hold the latch inoperative with respect to the dog to permit free swinging movement of the latter.

In witness that I claim the foregoing I have hereunto subscribed my name this 3rd day of June, 1925.

HARVEY J. LOUNSBURY.